United States Patent [19]

Korpics

[11] Patent Number: 4,848,470
[45] Date of Patent: Jul. 18, 1989

[54] PROCESS FOR REMOVING FLOW-RESTRICTING MATERIALS FROM WELLS

[75] Inventor: Charles J. Korpics, Orland Park, Ill.

[73] Assignee: Acme Resin Corporation, Westchester, Ill.

[21] Appl. No.: 274,354

[22] Filed: Nov. 21, 1988

[51] Int. Cl.$^4$ .................... E21B 21/00; E21B 37/06
[52] U.S. Cl. .................... 166/312; 166/276; 166/295; 252/8.552
[58] Field of Search ............... 166/276, 281, 295, 303, 166/305.1, 312, 902; 252/8.551, 8.552

[56] References Cited

U.S. PATENT DOCUMENTS

| | | | |
|---|---|---|---|
| 3,402,770 | 9/1968 | Messenger | 166/312 X |
| 3,976,135 | 8/1976 | Anderson | 166/295 X |
| 4,085,059 | 4/1978 | Smith et al. | 252/DIG. 8 X |
| 4,276,186 | 6/1981 | Bakos et al. | 252/DIG. 8 X |
| 4,514,310 | 4/1985 | Heilweil | 166/312 X |
| 4,541,489 | 9/1985 | Wu | 166/312 |

Primary Examiner—George A. Suchfield
Attorney, Agent, or Firm—Rockey and Rifkin

[57] ABSTRACT

An improved process for removing from a wellbore in a subterranean formation particulate material bonded together by a cured phenolic resin. The material is contacted with a solvent composition comprising a liquid selected from the groups: N,N-dimethylformamide, N-methyl-2-pyrrolidone and mixtures thereof for a sufficient time to separate the particulate material and then the separated material is removed from the wellbore.

9 Claims, No Drawings

PROCESS FOR REMOVING FLOW-RESTRICTING MATERIALS FROM WELLS

FIELD OF THE INVENTION

This invention relates to a process for removing flow-restricting material from a wellbore in a subterranean formation which has been treated with a particulate material coated with a curable phenolic resin.

BACKGROUND OF THE INVENTION

Subterranean formations surrounding oil wells, gas wells, water wells and other similar bore holes, are frequently treated with particulate material such as sand which has been coated with a curable phenolic resin. The type of treatments vary but can include hydraulic fracturing, sand consolidation, and gravel pack completion. In these treatments the coated particulate material is injected into the well and into the geological formation surrounding the bore hole. The curable phenolic resin coating on the particulate material is cured in the formation to bond the particulate material together. This gives a permeable filter which prevents small sand particles and other finely divided material from blocking the perforations in the well casings and from damaging the pumping and other handling equipment.

Occasionally an excess of the resin coated particulate material is pumped down into the well and fills the wellbore above the perforations in the well casing. If the resin coating on the particulate material cures within the wellbore, it firms a consolidated mass which drastically impedes the flow of liquid from the well. When the occurs, it is often necessary to employ a special boring rig to remove the consolidated material to obtain satisfactory production from the well. Such a procedure is both time-consuming and expensive.

We have now discovered that certain solvents will break up the consolidated material permitting its removal from the wellbore without the need to resort to the costly boring procedure.

SUMMARY OF THE INVENTION

In accordance with this invention there is provided a process for removing from a wellbore in a subterranean formation particulate material which has been bonded together by a cured phenolic resin. This process comprises contacting the bonded particulate material with a solvent composition containing a liquid selected from the group N,N-dimethylformamide, N-methyl-2-pyrrolidone, and mixtures thereof for a sufficient time to break up the particulate material. The separated material is then removed from the wellbore.

DETAILED DESCRIPTION OF THE INVENTION

As mentioned previously, wells are frequently treated with particulate material coated with a curable phenolic resin. The particulate materials used for this purpose include, for example, sand, sintered bauxite, zircon and glass beads. The curable phenolic resins used to coat the particulate material are either novolak or resole resins. As is well known in the art, the resole resins can cure and harden by heat alone. On the other hand, the novolak resins require the presence of a curing agent such as hexamethylenetetramine to make them heat curable.

When an excess of the resin coated material is pumped down the well it may fill the wellbore to a level above the perforations in the well casing. This is known in the industry as a screenout. When a screenout occurs, the flow rate from the well is greatly reduced. If the resin coating on the particulate material has not yet cured it is sometimes possible to remove the excess material from the wellbore by means of a water jet. However, the resin coating on the particulate material may cure due to the elevated temperature in the well. In the curing process, resin coating one particle cross-links with resin coating adjacent particles thereby binding the particulate material into a flow-restricting, consolidated mass. When this occurs it is almost impossible to remove this flow-restricting material by a water jet. It has been necessary to resort to an expensive drilling to open up the wellbore.

In the practice of the present invention a solvent composition is used to dissolve part of the cured resin which binds the particulate material together. Enough of the resin is dissolved to cause the solid mass to disintegrate. The loosened particulate material can then be pumped from the well. Most of the common solvents are unsuitable for this purpose. The present invention is based on the discovery that two liquids, N,N-dimethylformamide and N-methyl-2-pyrrolidone, are capable of breaking up the solid mass.

The solvent compositions used in the practice of this invention can be the foregoing liquids without dilution (neat) or the liquids can be diluted with from about 1% to about 40% by volume of a diluent. Various diluents, including water, may be used for this purpose.

In carrying out the process of this invention, the solvent composition is pumped into the well to contact the material which has been bonded together with the cured phenolic resin. The solvent composition is maintained in contact with the flow-inhibiting material for a sufficient time to cause this material to soften or break up and become flowable. The mixture of solvent and flowable material is then displaced from the well by means of water or other displacing fluid.

The solvent compositions used in the practice of this invention are most effective when they are maintained in contact with the flow-inhibiting material at temperatures of from about 40° C. to about 150° C. Such temperatures are usually present in the subterranean formation where this invention is practiced. In certain applications it may be desirable to warm the solvent composition before it is placed in the well.

The following examples illustrate the invention. It is to be understood that the examples are illustrated only and are not intended to limit the invention in any way. In the examples all parts and percentages are by weight unless otherwise indicated.

EXAMPLE 1

A slurry of resin coated sand in 2% aqueous KCl solution was packed in polypropylene tubing, sealed and heated at 93° C. for 24 hours. This caused the resin coating to cure, bonding together the sand particles to form a slug of about 0.64×5 cm. The resin coated sand was ACFRAC CR 20/40, a sand coated with a curable phenolic resin available from the Acme Resin Corporation, Westchester, Ill. Slugs composed of sand bonded together by the cured resin coated sand were contacted with N-methyl-2-pyrrolidone at various temperatures and the time at which disintegration of the slug occurred was noted. The experiments were repeated using N-methyl-2-pyrrolidone diluted with varying amounts of water. The results given in Table I demonstrate that N-methyl-2-pyrrolidone is capable of separating the bonded sand particles even when the solvent is diluted with water.

TABLE I
EFFECT OF N—METHYL-2-PYRROLIDONE (MPD) ON SAND PARTICLES BONDED WITH A PHENOLIC RESIN

| Solvent | Temp. (°C.) | Contact Time (hrs) | Results |
|---|---|---|---|
| MPD (neat) | 21 | 48 | No Apparent Effect |
|  | 66 | 3 | Slug Disintegrated |
|  | 93 | 1 | Slug Disintegrated |
| MPD/H$_2$O 75/25 (vol) | 21 | 72 | Slug Disintegrated |
|  | 66 | 3 | Slug Disintegrated |
|  | 93 | 2 | Slug Disintegrated |
| MPD/H$_2$O 50/50 (vol) | 21 | 48 | No Apparent Effect |
|  | 93 | 48 | No Apparent Effect |

EXAMPLE 2

The general procedure of Example 1 was followed except that N,N-dimethylformamide was used instead of N-methyl-2-pyrrolidone. The results given in Table II show that this solvent, either neat or diluted with water, is effective in separating the bonded sand particles.

TABLE II
EFFECT OF N,N—DIMETHYLFORMAMIDE (DMF) ON SAND PARTICLES BONDED WITH A PHENOLIC RESIN

| Solvent | Temp. (°C.) | Contact Time (hrs) | Results |
|---|---|---|---|
| DMF (neat) | 21 | 16 | Slug Softened |
|  | 66 | 1 | Slug Disintegrated |
|  | 93 | 1 | Slug Disintegrated |
| DMF/H$_2$O 75/25 (vol) | 21 | 72 | Slug Softened |
|  | 66 | 4 | Slug Disintegrated |
|  | 93 | 1 | Slug Disintegrated |
| DMF/H$_2$O 50/50 (vol) | 21 | 48 | No Apparent Effect |
|  | 93 | 48 | No Apparent Effect |

Thus it is apparent that there has been provided, in accordance with the invention, a process for removing flow-restricting material from a wellbore in a subterranean formation that fully satisfies the objective, aims and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. A process for removing from a wellbore in a subterranean formation particulate material bonded together by a cured phenolic resin which comprises:
   contacting said particulate material, bonded together by a cured phenolic resin, with a solvent composition comprising a liquid selected from the group consisting of N,N-dimethylformamide, N-methyl-2-pyrrolidone, and mixtures thereof for a sufficient time to separate the particulate material; and removing the separated particulate material from the wellbore.

2. The process of claim 1 wherein the solvent composition contains from about 1% to about 40% by volume of a diluent.

3. The process of claim 2 wherein the diluent is water.

4. The process of claim 1 wherein the particulate material bonded together by a cured phenolic resin is contacted with the solvent composition at a temperature of from about 40° C. to about 150° C.

5. The process of claim 1 wherein the particulate matter is sand.

6. The process of claim 1 wherein the particulate matter is sintered bauxite.

7. The process of claim 1 wherein the phenolic resin is phenol-formaldehyde resin.

8. The process of claim 1 wherein the phenolic resin is a resole resin.

9. The process of claim 1 wherein the phenolic resin is a novolak resin cured with hexamethylenetetramine.

* * * * *